(12) United States Patent
Peng et al.

(10) Patent No.: US 10,055,051 B2
(45) Date of Patent: Aug. 21, 2018

(54) TERMINAL CONFIGURED TO DETERMINE A HOLDING GESTURE FOR THE TERMINAL

(71) Applicant: HUAWEI DEVICE (DONGGUAN) CO., LTD., Dongguan (CN)

(72) Inventors: Xu Peng, Shanghai (CN); Hang Li, Shenzhen (CN); Chao Meng, Shanghai (CN); Hongchao Leng, Shanghai (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 56 days.

(21) Appl. No.: 15/100,186

(22) PCT Filed: Nov. 25, 2014

(86) PCT No.: PCT/CN2014/092119
§ 371 (c)(1),
(2) Date: May 27, 2016

(87) PCT Pub. No.: WO2015/078350
PCT Pub. Date: Jun. 4, 2015

(65) Prior Publication Data
US 2017/0003798 A1     Jan. 5, 2017

(30) Foreign Application Priority Data
Nov. 27, 2013  (CN) .......................... 2013 1 0618045

(51) Int. Cl.
*G06F 3/045*     (2006.01)
*G06F 3/041*     (2006.01)
(Continued)

(52) U.S. Cl.
CPC .......... *G06F 3/0416* (2013.01); *G06F 1/1626* (2013.01); *G06F 1/1684* (2013.01);
(Continued)

(58) Field of Classification Search
CPC ........ G06F 3/041; G06F 3/0416; G06F 3/044; G06F 3/0488; G06F 3/04883
See application file for complete search history.

(56) References Cited

U.S. PATENT DOCUMENTS 9,002,419 B2 * 4/2015 Satou ...................... G06F 3/044
455/128
9,182,869 B2 * 11/2015 Satou ...................... G06F 1/169
(Continued)

FOREIGN PATENT DOCUMENTS

CN      101498977 A     8/2009
CN      202275356 U     6/2012
(Continued)

OTHER PUBLICATIONS

Partial English Translation and Abstract of Chinese Patent Application No. CN103995666, dated Jun. 1, 2016, 3 pages.
(Continued)

*Primary Examiner* — Vijay Shankar
(74) *Attorney, Agent, or Firm* — Conley Rose, P.C.

(57) ABSTRACT

A terminal, where the terminal includes a conductive sheet configured to form a capacitor with a hand when the hand holds the terminal, and a processor, connected to the conductive sheet, where the processor is configured to detect a capacitance of the capacitor, and determine a holding gesture for the terminal according to the detected capacitance and a preset correspondence between a capacitance and a holding gesture, and the conductive sheet is disposed in the terminal, and when the hand holds the terminal, the conductive sheet forms a capacitor with the hand. When the terminal is held using different holding gestures, capacitances of capacitors formed between the conductive sheet in
(Continued)

the terminal and the hand are different, and a correspondence between a capacitance and a holding gesture is preset using this difference.

20 Claims, 10 Drawing Sheets

(51) Int. Cl.
  *G06F 3/0488* (2013.01)
  *G06F 1/16* (2006.01)
  *G06F 3/044* (2006.01)

(52) U.S. Cl.
  CPC ............ *G06F 3/044* (2013.01); *G06F 3/0488* (2013.01); *G06F 3/04883* (2013.01)

(56) References Cited

U.S. PATENT DOCUMENTS

| | | |
|---|---|---|
| 2011/0157019 A1 | 6/2011 | Miura et al. |
| 2013/0201155 A1 | 8/2013 | Wu et al. |
| 2013/0215060 A1 | 8/2013 | Nakamura |
| 2014/0184957 A1 | 7/2014 | Satou et al. |
| 2014/0300579 A1 | 10/2014 | Rekimoto |

FOREIGN PATENT DOCUMENTS

| | | |
|---|---|---|
| CN | 102768606 A | 11/2012 |
| CN | 103282869 A | 9/2013 |
| CN | 103995666 A | 8/2014 |
| CN | 104216590 A | 12/2014 |
| EP | 1391807 A1 | 2/2004 |
| EP | 2085866 A1 | 8/2009 |
| EP | 2629181 A1 | 8/2013 |
| JP | 2000330946 A | 11/2000 |
| JP | 2013117915 A | 6/2013 |
| KR | 100936850 B1 | 1/2010 |
| WO | 2012049942 A1 | 4/2012 |
| WO | 2013084820 A1 | 6/2013 |
| WO | 2013088655 A1 | 6/2013 |

OTHER PUBLICATIONS

Partial English Translation and Abstract of Chinese Patent Application No. CN104216590, dated Jun. 1, 2016, 5 pages.
Foreign Communication From a Counterpart Application, European Application No. 14866762.9, Extended European Search Report dated Oct. 28, 2016, 10 pages.
Foreign Communication From a Counterpart Application, PCT Application No. PCT/CN2014/092119, English Translation of International Search Report dated Feb. 26, 2015, 3 pages.
Foreign Communication From a Counterpart Application, PCT Application No. PCT/CN2014/092119, English Translation of Written Opinion dated Feb. 26, 2015, 8 pages.
Partial English Translation and Abstract of Japanese Patent Application No. JPA2000330946, dated Nov. 30, 2000, 9 pages.
Partial English Translation and Abstract of Japanese Patent Application No. JPA2013117915, dated Jun. 13, 2013, 18 pages.
Foreign Communication From a Counterpart Application, Japanese Application No. 2016-534669, Japanese Office Action dated Jan. 10, 2017, 5 pages.
Foreign Communication From a Counterpart Application, Japanese Application No. 2016-534669, English Translation of Japanese Office Action dated Jan. 10, 2017, 7 pages.
Foreign Communication From a Counterpart Application, European Application No. 14866762.9, European Office Action dated Sep. 1, 2017, 6 pages.
Foreign Communication From a Counterpart Application, Korean Application No. 10-2016-7016090, Korean Office Action dated Dec. 7, 2017, 6 pages.
Foreign Communication From a Counterpart Application, Korean Application No. 10-2016-7016090, English Translation of Korean Office Action dated Dec. 20, 2017, 7 pages.
Machine Translation and Abstract of Chinese Publication No. CN102768606, Nov. 7, 2012, 10 pages.
Foreign Communication From a Counterpart Application, Chinese Application No. 201310618045.0, Chinese Search Report dated Jun. 20, 2018, 2 pages.
Foreign Communication From a Counterpart Application, Chinese Application No. 201310618045.0, Chinese Office Action dated Jun. 28, 2018, 7 pages.

* cited by examiner

TERMINAL CONFIGURED TO DETERMINE A HOLDING GESTURE FOR THE TERMINAL

CROSS-REFERENCE TO RELATED APPLICATIONS

This application is a U.S. National Stage of International Application No. PCT/CN2014/092119, filed on Nov. 25, 2014, which claims priority to Chinese Patent Application No. 201310618045.0, filed on Nov. 27, 2013, both of which are hereby incorporated by reference in their entireties.

TECHNICAL FIELD

Embodiments of the present disclosure relate to the field of communications, and in particular, to a terminal.

BACKGROUND

Nowadays, large-screen mobile phones grow in popularity, but as a screen of a mobile phone becomes larger, it is more difficult to control the entire screen of the mobile phone using a single hand.

As regards to the foregoing problem, a manner of manual tapping is used in the prior art to switch an operation interface on a screen, to adapt to operations in the case of different holding gestures (for example, holding with the left hand, holding with the right hand, or holding with both hands). For example, when a user holds a mobile phone with the right hand and intends to dial a number, the user taps a selection button on a screen using the thumb, switches a virtual keyboard to a region in which the right hand can perform control, and dials the number.

However, in the foregoing manner of switching performed by the left hand or the right hand, a user is required to complete the switching by tapping, which causes great operation difficulty and is not sufficiently intelligent.

SUMMARY

Embodiments of the present disclosure provide a terminal, which may determine a holding gesture for the terminal.

According to a first aspect, a terminal is provided, including at least one conductive sheet configured to form at least one capacitor with a hand when the hand holds the terminal, and a processor, connected to the at least one conductive sheet, where the processor is configured to detect a capacitance of the at least one capacitor, and determine a holding gesture for the terminal according to the detected capacitance and a preset correspondence between a capacitance and a holding gesture.

With reference to the first aspect, in an implementation manner of the first aspect, the at least one conductive sheet includes a first conductive sheet and a second conductive sheet, located on or near the left side and the right side of the terminal respectively. The at least one conductive sheet being configured to form at least one capacitor with a hand when the hand holds the terminal further includes when the hand holds the terminal, the first conductive sheet and the second conductive sheet forming a first capacitor and a second capacitor with the hand respectively, and the processor being connected to the at least one conductive sheet, where the processor is configured to detect a capacitance of the at least one capacitor, and determine a holding gesture for the terminal according to the detected capacitance and a preset correspondence between a capacitance and a holding gesture further includes the processor being separately connected to the first conductive sheet and the second conductive sheet, where the processor is configured to separately detect capacitances of the first capacitor and the second capacitor, and determine the holding gesture for the terminal according to the detected capacitances and the preset correspondence between the capacitance and the holding gesture.

With reference to the first aspect or any one of the foregoing implementation manners, in another implementation manner of the first aspect, the preset correspondence between the capacitance and the holding gesture includes determining that the holding gesture for the terminal is holding with the left hand when the capacitance of the first capacitor is greater than the capacitance of the second capacitor, or determining that the holding gesture for the terminal is holding with the right hand when the capacitance of the first capacitor is less than the capacitance of the second capacitor.

With reference to the first aspect or any one of the foregoing implementation manners, in another implementation manner of the first aspect, the preset correspondence between the capacitance and the holding gesture includes determining that the holding gesture for the terminal is holding with the left hand when a difference between the capacitance of the first capacitor and the capacitance of the second capacitor is greater than a first threshold, or determining that the holding gesture for the terminal is holding with the right hand when a difference between the capacitance of the second capacitor and the capacitance of the first capacitor is greater than a second threshold.

With reference to the first aspect or any one of the foregoing implementation manners, in another implementation manner of the first aspect, the preset correspondence between the capacitance and the holding gesture includes determining that the holding gesture for the terminal is holding with the left hand when capacitance data belongs to a first data set, where the capacitance data is formed by the capacitance of the first capacitor and the capacitance of the second capacitor, the first data set is a data set determined in advance, and the first data set corresponds to holding with the left hand, or determining that the holding gesture for the terminal is holding with the right hand when capacitance data belongs to a second data set, where the second data set is a data set determined in advance, and the second data set corresponds to holding with the right hand.

With reference to the first aspect or any one of the foregoing implementation manners, in another implementation manner of the first aspect, the capacitance data is a data point that has a horizontal coordinate being the capacitance of the first capacitor, and a vertical coordinate being the capacitance of the second capacitor, and the first data set and the second data set are coordinate regions in a coordinate system.

With reference to the first aspect or any one of the foregoing implementation manners, in another implementation manner of the first aspect, the first conductive sheet and the second conductive sheet are symmetrically arranged along a central line between the left side and the right side of the terminal.

With reference to the first aspect or any one of the foregoing implementation manners, in another implementation manner of the first aspect, the processor includes a capacitance detection chip and a central processing unit (CPU), where the capacitance detection chip is connected to the CPU, and the capacitance detection chip is separately connected to the first conductive sheet and the second conductive sheet. The capacitance detection chip is configured to separately detect the capacitances of the first capacitor and the second capacitor, and the CPU is configured to determine the holding gesture for the terminal according to the detected capacitances and the preset correspondence between a capacitance and a holding gesture.

With reference to the first aspect or any one of the foregoing implementation manners, in another implementation manner of the first aspect, the capacitance detection chip includes multiple pins, where the first conductive sheet is connected to a first pin of the multiple pins using a first conductive wire, and the second conductive sheet is connected to a second pin of the multiple pins using a second conductive wire, and the multiple pins further include a third pin and a fourth pin, where the third pin is connected to a third conductive wire, the third conductive wire is arranged in parallel with the first conductive wire, the fourth pin is connected to a fourth conductive wire, and the fourth conductive wire is arranged in parallel with the second conductive wire.

With reference to the first aspect or any one of the foregoing implementation manners, in another implementation manner of the first aspect, the at least one conductive sheet includes a third conductive sheet, where the third conductive sheet is located on the left side or the right side of the terminal, or the third conductive sheet is located on the back side of the terminal. The at least one capacitor is a third capacitor formed by the third conductive sheet and the hand, and the preset correspondence between the capacitance and the holding gesture includes determining that the holding gesture for the terminal is holding with the left hand when a capacitance of the third capacitor belongs to a first value range, or determining that the holding gesture for the terminal is holding with the right hand when a capacitance of the third capacitor belongs to a second value range.

With reference to the first aspect or any one of the foregoing implementation manners, in another implementation manner of the first aspect, a length of a conductive sheet of the at least one conductive sheet is greater than or equal to six centimeters, and a width of the conductive sheet of the at least one conductive sheet is greater than or equal to one point five millimeters.

With reference to the first aspect or any one of the foregoing implementation manners, in another implementation manner of the first aspect, a conductive sheet of the at least one conductive sheet is any one of the following a copper sheet, a flexible printed circuit (FPC), a steel use stainless (SUS) steel sheet, and graphite.

With reference to the first aspect or any one of the foregoing implementation manners, in another implementation manner of the first aspect, the processor includes a capacitance detection chip and a CPU, where the capacitance detection chip is connected to the at least one conductive sheet, and is configured to detect the capacitance of the at least one capacitor, and the CPU is connected to the capacitance detection chip, and is configured to determine the holding gesture for the terminal according to the detected capacitance and the preset correspondence between a capacitance and a holding gesture.

With reference to the first aspect or any one of the foregoing implementation manners, in another implementation manner of the first aspect, the processor is a CPU.

With reference to the first aspect or any one of the foregoing implementation manners, in another implementation manner of the first aspect, the processor is a capacitance detection chip.

According to a second aspect, a terminal is provided, including a capacitive touch panel configured to generate a capacitance change when a hand touches the capacitive touch panel, and a processor configured to determine, according to the capacitance change, a corresponding touch region on the capacitive touch panel that the hand touches, and determine a holding gesture for the terminal according to the touch region and a preset correspondence between a touch region and a holding gesture.

With reference to the second aspect, in an implementation manner of the second aspect, the preset correspondence between the touch region and the holding gesture includes dividing the capacitive touch panel into three touch regions in advance, where a first touch region is a region, which is taped or slid by the thumb of the left hand when the left hand holds the terminal, on the capacitive touch panel, a second touch region is a region, which is in contact with the palm of the left hand when the left hand holds the terminal, on the capacitive touch panel, and a third touch region is a region, which is in contact with the palm of the right hand when the right hand holds the terminal, on the capacitive touch panel, and determining that holding with the left hand is the holding gesture for the terminal when there are capacitance changes in the first touch region and the second touch region or determining that holding with the right hand is the holding gesture for the terminal when there are capacitance changes in the first touch region and the third touch region.

With reference to the second aspect or any one of the foregoing implementation manners, in another implementation manner of the second aspect, the preset correspondence between the touch region and the holding gesture includes dividing the capacitive touch panel into three touch regions in advance, where a first touch region is a region, which is taped or slid by the thumb of the right hand when the right hand holds the terminal, on the capacitive touch panel, a second touch region is a region, which is in contact with the palm of the right hand when the right hand holds the terminal, on the capacitive touch panel, and a third touch region is a region, which is in contact with the palm of the left hand when the left hand holds the terminal, on the capacitive touch panel, and determining that holding with the right hand is the holding gesture for the terminal when there are capacitance changes in the first touch region and the second touch region, or determining that holding with the left hand is the holding gesture for the terminal when there are capacitance changes in the first touch region and the third touch region.

In the embodiments of the present disclosure, at least one conductive sheet is disposed in a terminal, and when a hand holds the terminal, the at least one conductive sheet separately forms capacitors with the hand. When the terminal is held using different holding gestures, capacitances of the capacitors formed between the conductive sheet in the terminal and the hand are different, and a correspondence between a capacitance and a holding gesture is set using this difference. Therefore, during actual detection, a holding gesture for the terminal can be determined by performing matching according to a detected capacitance of the capacitor and the preset correspondence.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 11 is a schematic diagram of a capacitance change in a contact region of a capacitive touch panel;

FIG. 12 is another schematic diagram of a capacitance change in a contact region of a capacitive touch panel;

DESCRIPTION OF EMBODIMENTS

The following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that a terminal in the embodiments of the present disclosure may be user equipment (UE), including but not limited to a mobile station (MS), a mobile terminal, a mobile telephone, a handset, a tablet computer, portable equipment, or the like.

Figure 1:
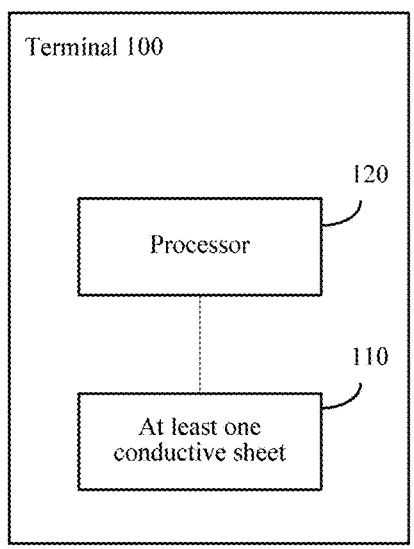
FIG. 1 is a schematic block diagram of a terminal according to an embodiment of the present disclosure.

When a hand approaches a conductor, a capacitor is formed between the hand and the conductor. When a hand approaches a conductor using different gestures, affected by factors such as an approaching distance and an area, capacitances of capacitors formed between the hand and the conductor may be different. An embodiment of the present disclosure provides a terminal, which can detect a gesture of holding the terminal by a hand, that is, a holding gesture. As shown in FIG. 1, the terminal 100 includes at least one conductive sheet 110 configured to form at least one capacitor with a hand when the hand holds the terminal 100, and a processor 120, connected to the at least one conductive sheet 110, where the processor 120 is configured to detect a capacitance of the at least one capacitor, and determine a holding gesture for the terminal 100 according to the detected capacitance and a preset correspondence between a capacitance and a holding gesture.

In this embodiment of the present disclosure, a conductive sheet is disposed in the terminal, and when a hand holds the terminal, the conductive sheet forms a capacitor with the hand. When the terminal is held using different holding gestures, capacitances of capacitors formed between the conductive sheet in the terminal and the hand are different, and a correspondence between a capacitance and a holding gesture is set using this difference. Therefore, during actual detection, a holding gesture for the terminal can be determined according to a detected capacitance of the capacitor and the preset correspondence.

It should be noted that in this embodiment of the present disclosure, a specific form of the processor 120 is not limited, and there may be the following multiple configuration manners.

Optionally, the processor 120 may include a capacitance detection chip and a CPU, where the capacitance detection chip (for example, the capacitance detection chip may be a capacitive sensor) is connected to the at least one conductive sheet 110, and is configured to detect the capacitance of the at least one capacitor, and the CPU is connected to the capacitance detection chip, and is configured to determine the holding gesture for the terminal 100 according to the detected capacitance and the preset correspondence between a capacitance and a holding gesture. In other words, a capacitance detection function of the terminal 100 may be performed by an independent capacitance detection chip, and a function of determining a holding gesture may be performed by the CPU of the terminal 100.

Optionally, the processor 120 may also be a CPU, that is, a capacitance detection function and a function of determining a holding gesture are integrated into the CPU of the terminal 100.

Optionally, the processor 120 may also be a capacitance detection chip. That is, a capacitance detection function and a function of determining a holding gesture that are of the terminal 100 are performed by the capacitance detection chip.

It should be understood that in this embodiment of the present disclosure, a material of the conductive sheet is not limited, and the conductive sheet may be made of any conductive conductor, and may be, for example, any one of the following a copper sheet, an FPC, an SUS steel sheet, and graphite. A conductive sheet made of a graphite material causes little interference to an antenna of the terminal.

In consideration of factors such as electrostatic discharge (ESD), the conductive sheet may be enveloped using a mechanical part, to prevent the conductive sheet from being exposed.

The holding gesture may include holding with the left hand, holding with the right hand, and holding with both hands.

In this embodiment of the present disclosure, a quantity and an arrangement manner of conductive sheets 110 are not limited, and the following manners may be used. There is one conductive sheet 110, which is disposed on the left side, or the right side, or the upper side, or the lower side of the terminal 100, or there are two conductive sheets, which are separately disposed on the left side and the right side of the terminal 100, or there are two conductive sheets 110, which are both located on the back side of the terminal 100, and are separately close to the left side and the right side of the terminal 100, or there are two conductive sheets, which are separately disposed on the upper side and the lower side of the terminal 100, or there are two conductive sheets, which are both located on the back side of the terminal 100, and are separately close to the upper side and the lower side of the terminal 100, or there are four conductive sheets 110, which are separately disposed on the upper side, the lower side, the left side, and the right side of the terminal 100, or there are four conductive sheets 110, which are all located on the back side of the terminal 100, and are separately close to the upper side, the lower side, the left side, and the right side of the terminal 100. Certainly, a quantity and a specific arrangement manner of the conductive sheets 110 may also be determined by taking advantage of experience and considering accuracy of identifying the left hand or the right hand in various arrangement manners during actual use.

Figure 2:
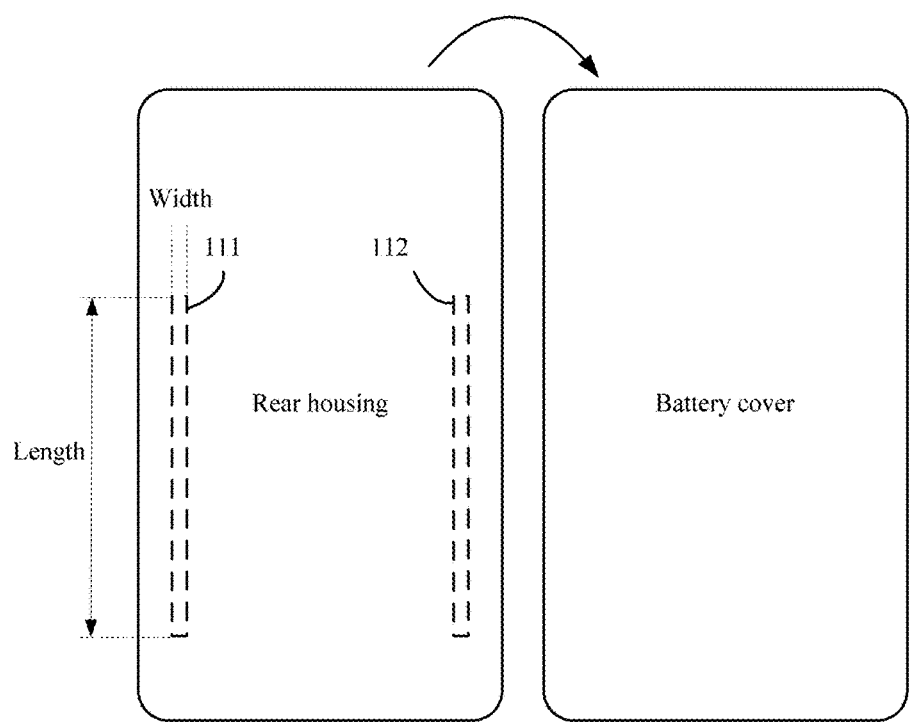
FIG. 2 is an exemplary diagram of a manner of arranging conductive sheets in a terminal according to an embodiment of the present disclosure.

For example, as shown in FIG. 2, a conductive sheet 111 and a conductive sheet 112 are located on a rear housing of a terminal 100. The rear housing may cover a battery of the terminal 100. The conductive sheet 111 is approximately located in an area in which the left hand is located when the left hand holds the terminal, and the conductive sheet 112 is approximately located in an area in which the right hand is located when the right hand holds the terminal. Further, because both the conductive sheet 111 and the conductive sheet 112 are located on the rear housing of the terminal 100, the conductive sheet 111 and the conductive sheet 112 are closer to hands when the hands hold the terminal 100.

Optionally, when the terminal 100 uses the arrangement manner in FIG. 2, distances between the conductive sheet 111 and the conductive sheet 112 and the upper side and the lower side of the terminal 100 may be determined according to a size of the terminal 100. Furthermore, the conductive sheet 111 is approximately located in a covering area of the left hand on the terminal 100 when the left hand holds the terminal 100, and the conductive sheet 112 is approximately located in a covering area of the right hand on the terminal 100 when the right hand holds the terminal 100.

Furthermore, when a length of the terminal 100 (a distance between the upper side and the lower side of the terminal 100) is greater than a width of a hand, the hand habitually holds a lower part of the terminal 100, and in this case, the conductive sheet 111 and the conductive sheet 112 may be disposed at a lower position of the rear housing. When the length of the terminal 100 approximates to the width of a hand or is slightly greater than the width of a hand, the hand habitually holds a middle part of the terminal 100, and in this case, the conductive sheet 111 and the conductive sheet 112 may be disposed at a middle position of the rear housing.

In this embodiment of the present disclosure, a size of a conductive sheet such as a length and a width of the conductive sheet (where the length is a distance at which the conductive sheet extends between the upper side and the lower side of the terminal, and the width is a distance at which the conductive sheet extends between the left side and the right side of the terminal) may be determined by comprehensively considering factors such as a general size of a hand and a size of the terminal. For example, a length of a conductive sheet is greater than or equal to six centimeters, and a width of the conductive sheet is greater than or equal to one point five millimeters (for example, two millimeters).

Further, to ensure detection accuracy, the conductive sheet 110 may be insulated from other components of the terminal 100, that is, the conductive sheet 110 is not in direct contact with a conductor. During specific arrangement, it may be that a distance between the conductive sheet 110 and another conductor in an X/Y direction is greater than 0.1 millimeter, and a distance between the conductive sheet 110 and another conductor in a Z direction is greater than 1 millimeter (where the XYZ coordinate system is an orthogonal coordinate system created using length and width directions of the terminal 100 as the X and Y directions).

It should be understood that in this embodiment of the present disclosure, the capacitor formed by the conductive sheet 110 and the hand is related to an arrangement manner of the conductive sheet 110 and a holding manner of the hand. Furthermore, when the hand holds the terminal, there may be multiple contact regions between the hand and the terminal. The different contact regions of the hand and conductive sheets located within the contact regions (or closest to the contact regions) may form capacitors.

It should also be understood that a size of the conductive sheet 110 may be determined by comprehensively considering factors such as an actual size of the terminal 100, the general size of a hand, and a contact region between the hand and the terminal 100. To better achieve an objective of distinguishing different holding gestures, conductive sheets of the conductive sheets 110 may be separately disposed in contact regions corresponding to different holding gestures. In this way, when a hand holds the terminal 100 using a holding gesture, capacitances of capacitors formed by conductive sheets in different contact regions and the hand are obviously different, and a current holding manner of the hand can be determined using this difference.

It should be understood that there may be multiple preset correspondences between a capacitance and a holding gesture. There may also be different correspondences according to different quantities of conductive sheets.

Furthermore, when there is one conductive sheet, the correspondence may be a correspondence between a holding gesture and a value range of a capacitance of a capacitor formed by a hand and the conductive sheet, or when there are two conductive sheets, the correspondence may be a correspondence between a holding gesture and a magnitude relationship of capacitances of capacitors separately formed by the two conductive sheets and a hand.

Further, when there are three or more conductive sheets, the correspondence may be a correspondence between a holding gesture and a conductive sheet, where among capacitors formed by the multiple conductive sheets and a hand, a capacitance of a capacitor corresponding to the conductive sheet is greater than a preset threshold. For example, four conductive sheets are disposed in the terminal in total, with each disposed on the upper side, the lower side, the left side, and the right side, and separately form first, second, third, and fourth capacitors with the hand. The correspondence may be used to indicate that the hand holds the left side of the terminal when a capacitance of the first capacitor is greater than a preset threshold, that the hand holds the right side of the terminal when a capacitance of the second capacitor is greater than a preset threshold, that the hand holds the upper side of the terminal when a capacitance of the third capacitor is greater than a preset threshold, that the hand holds the lower side of the terminal when a capacitance of the fourth capacitor is greater than a preset threshold, that the hand holds the upper left corner of the terminal when both the capacitances of the first capacitor and the third capacitor are greater than a preset threshold, that the hand holds the lower left corner of the terminal when both the capacitances of the first capacitor and the fourth capacitor are greater than a preset threshold, that the hand holds the upper right corner of the terminal when both the capacitances of the second capacitor and the third capacitor are greater than a preset threshold, and that the hand holds the lower right corner of the terminal when both the capacitances of the second capacitor and the fourth capacitor are greater than a preset threshold.

Figure 3:
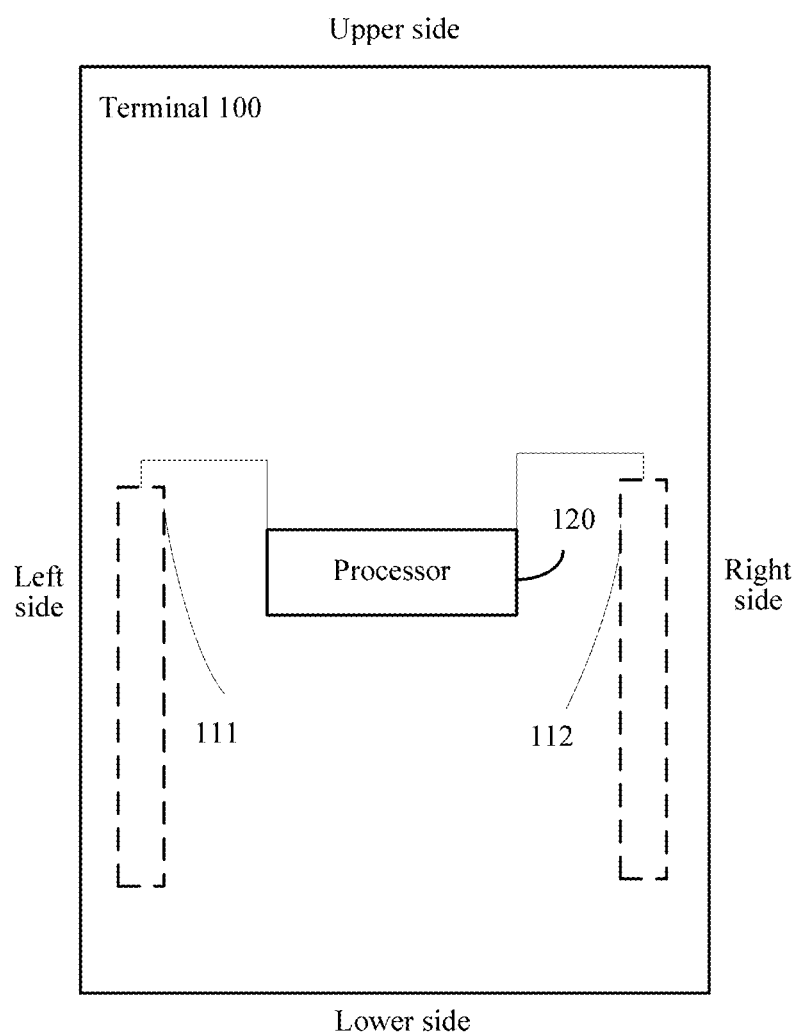
FIG. 3 is an exemplary diagram of a manner of arranging conductive sheets in a terminal according to an embodiment of the present disclosure.

The following provides a description with reference to FIG. 3 using two conductive sheets (a conductive sheet 111 and a conductive sheet 112 in FIG. 3) as an example, where the two conductive sheets are separately located on or near the left side and the right side of a terminal 100. When a hand holds the terminal 100, the conductive sheet 111 forms a first capacitor with the hand, and the conductive sheet 112 forms a second capacitor with the hand.

For example, when the right hand holds the terminal 100, the web space between the thumb and the index finger and four fingers of the right hand are separately in contact with the terminal, the first capacitor may be formed by the four fingers of the right hand and the conductive sheet 111, and the second capacitor may be formed by the web space between the thumb and the index finger of the right hand and the conductive sheet 112. The same is applied to the left hand.

A capacitance of a capacitor may be determined using a formula $C=Q/V=\varepsilon A/d$, where Q is a quantity of electricity of a conductive sheet, V is an electric potential difference between two conductive plates, and $\varepsilon$ is a dielectric constant. A value of A depends on an area of overlap of two capacitor plates, and d is a distance between the two capacitor plates. Using the right hand holding the terminal 100 as an example, when the fingers of the right hand and the web space between the thumb and the index finger of the right hand form capacitors with the conductive sheet 111 and the conductive sheet 112 respectively, distances between capacitor plates and/or areas of capacitor plates of the two capacitors may be different. Therefore, capacitances of the first capacitor and the second capacitor are different. A holding gesture for the terminal can be detected using this characteristic. The same is applied to the left hand.

It should be further noted that when a length and a width of the terminal 100 are unequal, the left side and the right side of the terminal may refer to two sides in parallel with a length direction of the terminal, and two sides in parallel with a width direction of the terminal are the upper side and the lower side of the terminal (referring to FIG. 3), or when a length and a width of the terminal 100 are equal, the left side and the right side of the terminal may be two corresponding sides in the length direction, or may be two corresponding sides in the width direction. Certainly, the left side and the right side of the terminal may also be defined in another manner, which is further that two sides of the terminal 100 that are habitually held by a hand are the left side and the right side, and remaining two sides are the upper side and the lower side.

In the embodiment in FIG. 3, a processor 120 is separately connected to the first conductive sheet 111 and the second conductive sheet 112, and the processor 120 is configured to separately detect the capacitances of the first capacitor and the second capacitor, and determine a holding gesture for the terminal 100 according to the detected capacitances and a preset correspondence between a capacitance and a holding gesture.

In this embodiment of the present disclosure, a conductive sheet is disposed on each of the left side and the right side (or near each of the left side and the right side) of the terminal, and when a hand holds the terminal, the two conductive sheets separately form capacitors with the hand. When the terminal is held using different holding gestures, capacitances of the capacitors formed between the two conductive sheets and the hand are different, and a correspondence between a capacitance and a holding gesture is set using this difference. Therefore, during actual detection, a holding gesture for the terminal can be determined by performing matching according to a detected capacitance of the capacitor and the preset correspondence.

In this embodiment of the present disclosure, the preset correspondence between a capacitance and a holding gesture is not further limited. A capacitance corresponding to a holding gesture may be capacitances of two capacitors (the first capacitor and the second capacitor), or a difference between two capacitors, or any combination of capacitances of two conductive sheets.

The preset correspondence between a capacitance and a holding gesture may include determining that the holding gesture for the terminal 100 is holding with the left hand when the capacitance of the first capacitor is greater than the capacitance of the second capacitor, or determining that the holding gesture for the terminal 100 is holding with the right hand when the capacitance of the first capacitor is less than the capacitance of the second capacitor.

For example, when the capacitance of the first capacitor is measured to be 20 picofarad (pF), and the capacitance of the second capacitor is measured to be 10 pF, it is determined that the holding gesture for the terminal 100 is holding with the left hand, or when the capacitance of the first capacitor is measured to be 14 pF, and the capacitance of the second capacitor is measured to be 16 pF, it is determined that the holding gesture for the terminal 100 is holding with the right hand.

Optionally, the preset correspondence between a capacitance and a holding gesture may include determining that the holding gesture for the terminal 100 is holding with the left hand when a difference between the capacitance of the first capacitor and the capacitance of the second capacitor is greater than a first threshold, or determining that the holding gesture for the terminal 100 is holding with the right hand when a difference between the capacitance of the second capacitor and the capacitance of the first capacitor is greater than a second threshold.

For example, the first threshold is 5 pF, and when a capacitance 1 of the first capacitor is 20 pF, and a capacitance 2 of the second capacitor is 14 pF, because the capacitance 1−the capacitance 2>5 pF, it is determined that the holding gesture for the terminal 100 is holding with the left hand. The second threshold is 5 pF, and when the capacitance 1 of the first capacitor is 12 pF, and the capacitance of the second capacitor is 19 pF, because the capacitance 2−the capacitance 1>5 pF, it is determined that the holding gesture for the terminal 100 is holding with the right hand.

It should be understood that the first and second thresholds may be a same threshold or different thresholds, and the first and second thresholds may be manually specified, for example, measured according to experience or experimental data.

Optionally, the preset correspondence between a capacitance and a holding gesture may include determining that the holding gesture for the terminal 100 is holding with the left hand when capacitance data belongs to a first data set, where the capacitance data is formed by the capacitance of the first capacitor and the capacitance of the second capacitor, the first data set is a data set determined in advance, and the first data set corresponds to holding with the left hand, or determining that the holding gesture for the terminal 100 is holding with the right hand when capacitance data belongs to a second data set, where the second data set is a data set determined in advance, and the second data set corresponds to holding with the right hand.

The capacitance data is formed by capacitances, but there may be multiple specific forming manners and specific forms of the data sets. Furthermore, the capacitance data may be indicated as a data point (A, B), where A is the capacitance of the first capacitor, and B is the capacitance of the second capacitor. Correspondingly, the data sets may be coordinate regions in a coordinate system, and in the coordinate system, reference capacitances (where reference capacitances are capacitances measured for reference conductive sheets when the coordinate regions are created) of the first capacitor are used as horizontal coordinates, and reference capacitances of the second capacitor are used as vertical coordinates, where different regions correspond to different holding gestures for the terminal. The different regions may be created by means of offline sampling, that is, regions in which data points are distributed when the left hand and the right hand hold the terminal are sampled offline. During specific determining, when (A, B) falls within a region of the different regions, a holding gesture corresponding to the region is used as a current holding gesture for the terminal.

Figure 4:
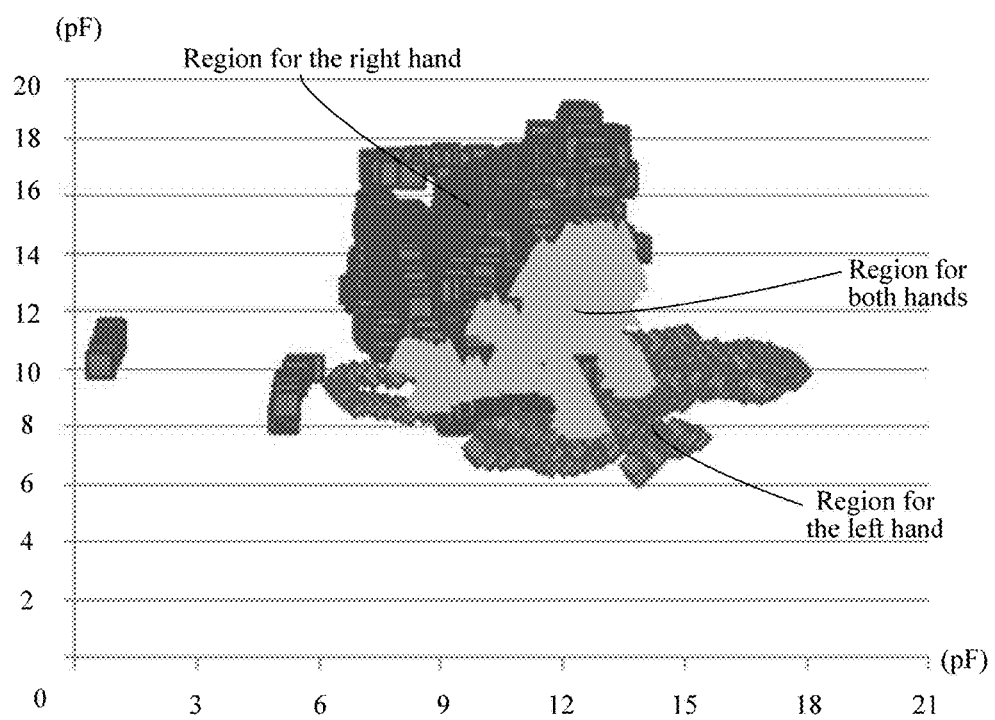
FIG. 4 is a diagram of coordinate regions corresponding to different holding gestures according to an embodiment of the present disclosure.

A description is provided with reference to FIG. 4 using an example. Three regions in a coordinate system shown in FIG. 4 are obtained by means of offline sampling, and are separately a region for the left hand, a region for the right hand, and a region for both hands. In the coordinate system, capacitances of the first capacitor are used as the horizontal axis, and capacitances of the second capacitor are used as the vertical axis. During actual detection, the processor 120 separately measures a capacitance A of the first capacitor and a capacitance B of the second capacitor, and then analyzes that a coordinate point (A, B) belongs to which region of the three regions. For example, when the coordinate point falls within the region for the right hand, the processor 120 determines that the terminal 100 is held by the right hand.

Certainly, capacitances of the capacitors may also form the capacitance data in other manners, for example, a form of a proportion X=A/B may be used, where A is the capacitance of the first capacitor, and B is the capacitance of the second capacitor. Correspondingly, the data set may be a value range, and region ranges corresponding to different holding manners may also be obtained by means of offline sampling. During specific determining, when X falls within a value range, a holding gesture corresponding to the value range may be used as a current holding gesture for the terminal.

Optionally, the first conductive sheet and the second conductive sheet may be symmetrically arranged along a central line between the left side and the right side of the terminal. Because the left hand and the right hand of a person are symmetrical, the two conductive sheets disposed on opposite sides may be symmetrically arranged. The conductive sheet on the left side is approximately located in a holding region of the left hand when the left hand holds the terminal 100, and the capacitive sheet on the right side is approximately located in a holding region of the right hand when the right hand holds the terminal 100. In this way, detection becomes more convenient.

Optionally, a length of a conductive sheet of the at least one conductive sheet 110 is greater than or equal to six centimeters, and a width of the conductive sheet of the at least one conductive sheet 110 is greater than or equal to one point five millimeters.

Figure 5:
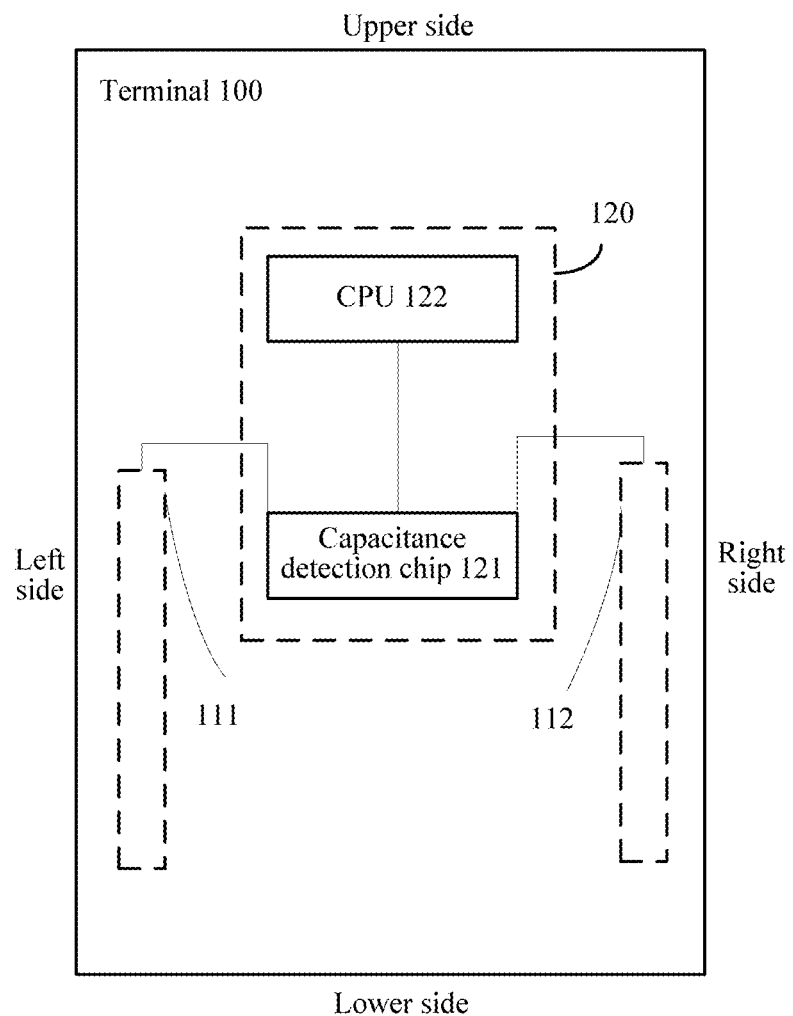
FIG. 5 is an exemplary diagram of a processor of a terminal according to an embodiment of the present disclosure.

Further, as shown in FIG. 5, the processor 120 includes a capacitance detection chip 121 and a CPU 122, where the capacitance detection chip 121 is connected to the CPU 122, and the capacitance detection chip 121 is separately connected to the first conductive sheet 111 and the second conductive sheet 112. The capacitance detection chip 121 is configured to separately detect capacitances of the first capacitor and the second capacitor, and the CPU 122 is configured to determine the holding gesture for the terminal 100 according to the detected capacitances and the preset correspondence between a capacitance and a holding gesture.

Figure 6:
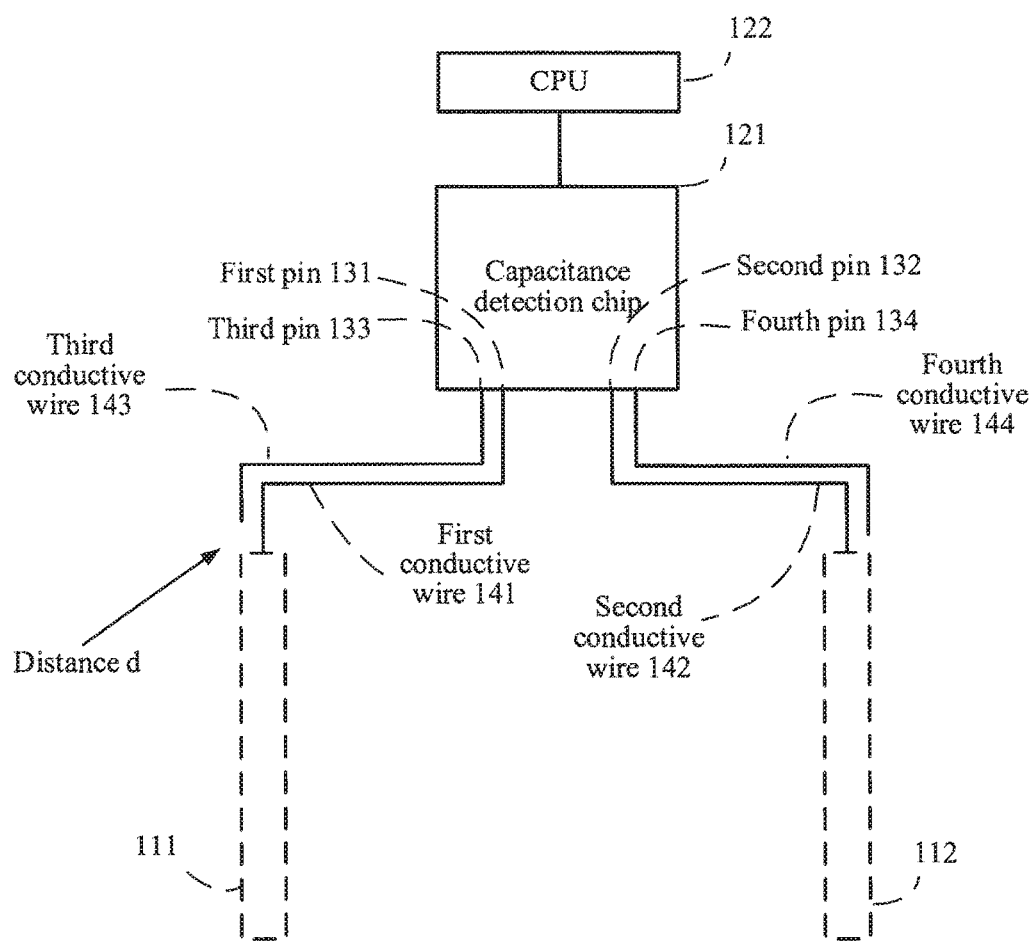
FIG. 6 is an exemplary diagram of connection relationships between a capacitance detection chip and conductive sheets.

Further, as shown in FIG. 6, the capacitance detection chip 121 includes a first pin 131, a second pin 132, a third pin 133, and a fourth pin 134, where the first conductive sheet 111 is connected to the first pin 131 using a first conductive wire 141, the second conductive sheet 112 is connected to the second pin 132 using a second conductive wire 142, the third pin 133 is connected to a third conductive wire 143, the third conductive wire 143 is arranged in parallel with the first conductive wire 141, the fourth pin 134 is connected to a fourth conductive wire 144, and the fourth conductive wire 144 is arranged in parallel with the second conductive wire 142.

The third conductive wire 143 is a differential wire of the first conductive wire 141, and the fourth conductive wire 144 is a differential wire of the second conductive wire 142, where the differential wire is used to compensate for a signal error generated during wiring, and improve accuracy of detecting a holding gesture for a terminal. It should be noted that a distance may be retained between a differential wire and a conductive sheet (referring to a distance d in FIG. 6), and may be, for example, three millimeters, to prevent a capacitance of a capacitor formed by the conductive sheet from being affected by the differential wire.

It should be noted that the conductive wires between the capacitance detection chip 121 and the conductive sheets and other components of the terminal 100 are arranged in the terminal 100 in such a way that impacts of the conductive wires and the other components on the capacitances of the capacitors formed by the conductive sheets are not greater than a preset threshold in order to improve detection precision.

For example, the capacitance detection chip 121 may be a capacitive sensor, a maximum identifiable capacitance of each pin of the capacitance detection chip 121 may be 40 pF, and the preset threshold may be set to 20 pF, that is, the other components of the terminal 100 and the conductive wires between the pins of the capacitive sensor and the conductive sheets are arranged in such a way that impacts on the capacitances of the capacitors formed by the conductive sheets are less than or equal to 20 pF. Further, wiring of each pin of the capacitive sensor may be kept away from wiring for a high speed signal in order to prevent detection precision from being affected by the wire.

Figure 7:
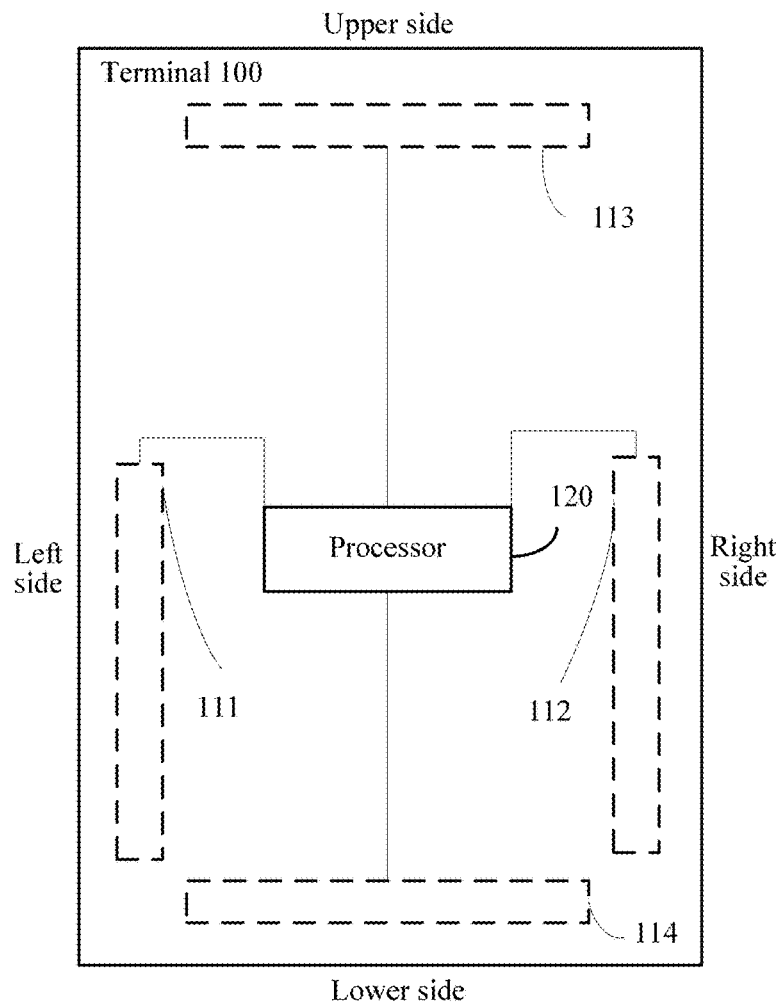
FIG. 7 is an exemplary diagram of a manner of arranging conductive sheets in a terminal according to an embodiment of the present disclosure.

The following describes, with reference to FIG. 7, an arrangement manner of the terminal 100 when there are four conductive sheets. In FIG. 7, conductive sheets are separately arranged on the left side, the right side, the upper side, and the lower side, and are a conductive sheet 111, a conductive sheet 112, a conductive sheet 113, and a conductive sheet 114 respectively.

When a hand holds the terminal 100 vertically, a holding manner of the hand may be detected using the conductive sheet 111 and the conductive sheet 112 on the left side and the right side, and the manner described in the embodiment corresponding to FIG. 2 may be used as a detection manner. Similarly, when a hand holds the terminal 100 horizontally, a holding manner of the hand may be detected using the conductive sheet 113 and the conductive sheet 114 on the upper side and the lower side, and the manner described in the embodiment corresponding to FIG. 2 may be used as a detection manner.

Optionally, as another embodiment, the at least one conductive sheet 110 includes a third conductive sheet, where the third conductive sheet is located on the left side or the right side of the terminal, or the third conductive sheet is located on the back side of the terminal. The at least one capacitor is a third capacitor formed by the third conductive sheet and the hand, and the preset correspondence between a capacitance and a holding gesture includes determining that the holding gesture for the terminal is holding with the left hand when a capacitance of the third capacitor belongs to a first value range, or determining that the holding gesture for the terminal is holding with the right hand when a capacitance of the third capacitor belongs to a second value range.

Furthermore, in this embodiment, only one conductive sheet (that is, the third conductive sheet) is disposed in the terminal 100, and the conductive sheet may be located on the back side of the terminal 100, or may be located on the left side or the right side of the terminal 100 (to better distinguish the left hand and right hand holding manners, try not to dispose the conductive sheet in a central region on the back side of the terminal).

A terminal whose holding gesture is detected by disposing at least one conductive sheet is described above in detail with reference to FIG. 1 to FIG. 7, and a terminal whose holding gesture is detected using a capacitive touch panel is described below in detail with reference to FIG. 8 to FIG. 13.

Figure 8:
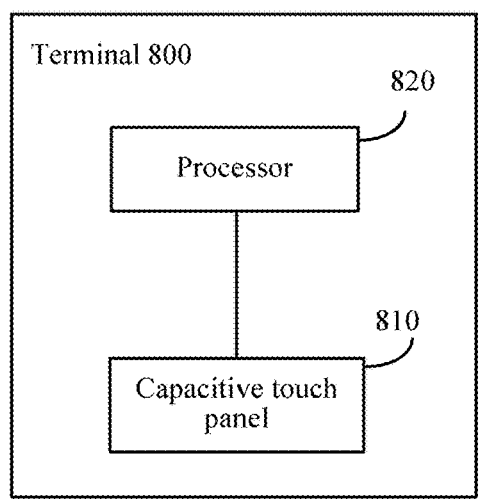
FIG. 8 is a schematic block diagram of a terminal according to another embodiment of the present disclosure.

In FIG. 8, a terminal 800 includes a capacitive touch panel 810 and a processor 820, where the capacitive touch panel 810 is configured to generate a capacitance change when a hand touches the capacitive touch panel 810, and the processor 820 is configured to determine, according to the capacitance change, a corresponding touch region on the capacitive touch panel 810 that the hand touches, and determine a holding gesture for the terminal 800 according to the touch region and a preset correspondence between a touch region and a holding gesture.

In this embodiment of the present disclosure, the corresponding touch region of the capacitive touch panel that the hand touches is determined using the capacitance change generated by the capacitive touch panel in the terminal, and the holding gesture for the terminal is intelligently determined according to the touch region and the preset correspondence between a touch region and a holding gesture.

It should be understood that in this embodiment of the present disclosure, the capacitive touch panel 810 may be divided into multiple touch regions in advance, and correspondences between hand holding manners and different touch regions or a combination of touch regions are created. The touch regions and the correspondences may be classified according to types of holding gestures intended for detection, which is not further limited in this embodiment of the present disclosure.

Optionally, the preset correspondence between a touch region and a holding gesture may include dividing the capacitive touch panel into three touch regions in advance, where a first touch region is a region, which is tapped or slid by the thumb of the left hand when the left hand holds the terminal, on the capacitive touch panel, a second touch region is a region, which is in contact with the palm of the left hand when the left hand holds the terminal, on the capacitive touch panel, and a third touch region is a region, which is in contact with the palm of the right hand when the right hand holds the terminal, on the capacitive touch panel, determining that holding with the left hand is the holding gesture for the terminal when there are capacitance changes in the first touch region and the second touch region, and determining that holding with the right hand is the holding gesture for the terminal when there are capacitance changes in the first touch region and the third touch region.

Optionally, the preset correspondence between a touch region and a holding gesture may include dividing the capacitive touch panel into three touch regions in advance, where a first touch region is a region, which is tapped or slid by the thumb of the right hand when the right hand holds the terminal, on the capacitive touch panel, a second touch region is a region, which is in contact with the palm of the right hand when the right hand holds the terminal, on the capacitive touch panel, and a third touch region is a region, which is in contact with the palm of the left hand when the left hand holds the terminal, on the capacitive touch panel, determining that holding with the right hand is the holding gesture for the terminal when there are capacitance changes in the first touch region and the second touch region, and determining that holding with the left hand is the holding gesture for the terminal when there are capacitance changes in the first touch region and the third touch region.

Figure 9:
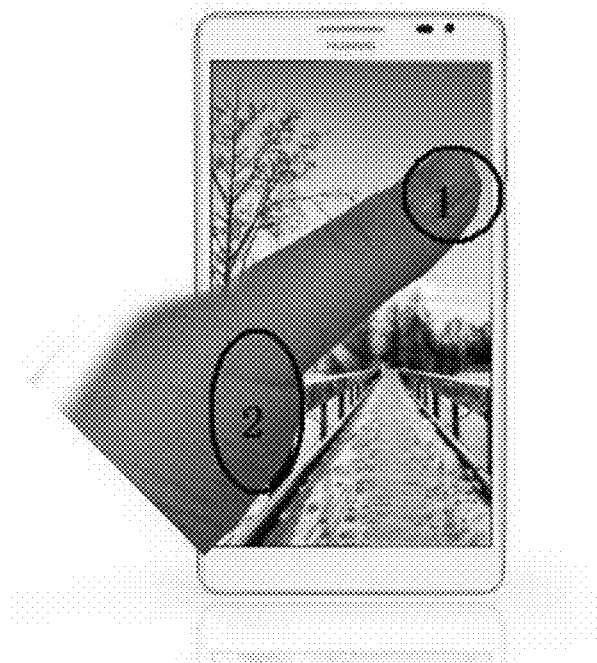
FIG. 9 is a schematic diagram of a region, which is in contact with the left hand, on a capacitive touch panel when the left hand holds a terminal.
Figure 10:
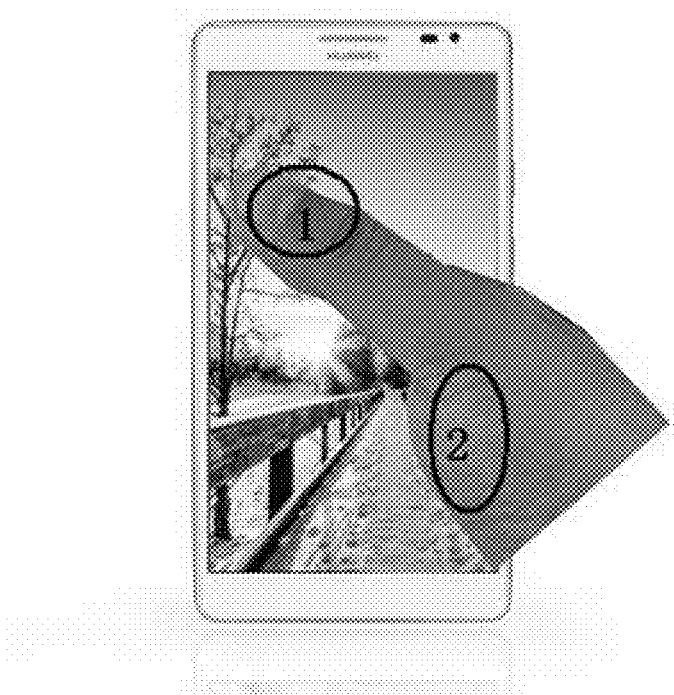
FIG. 10 is a schematic diagram of a region, which is in contact with the right hand, on a capacitive touch panel when the right hand holds a terminal.
Figure 11:
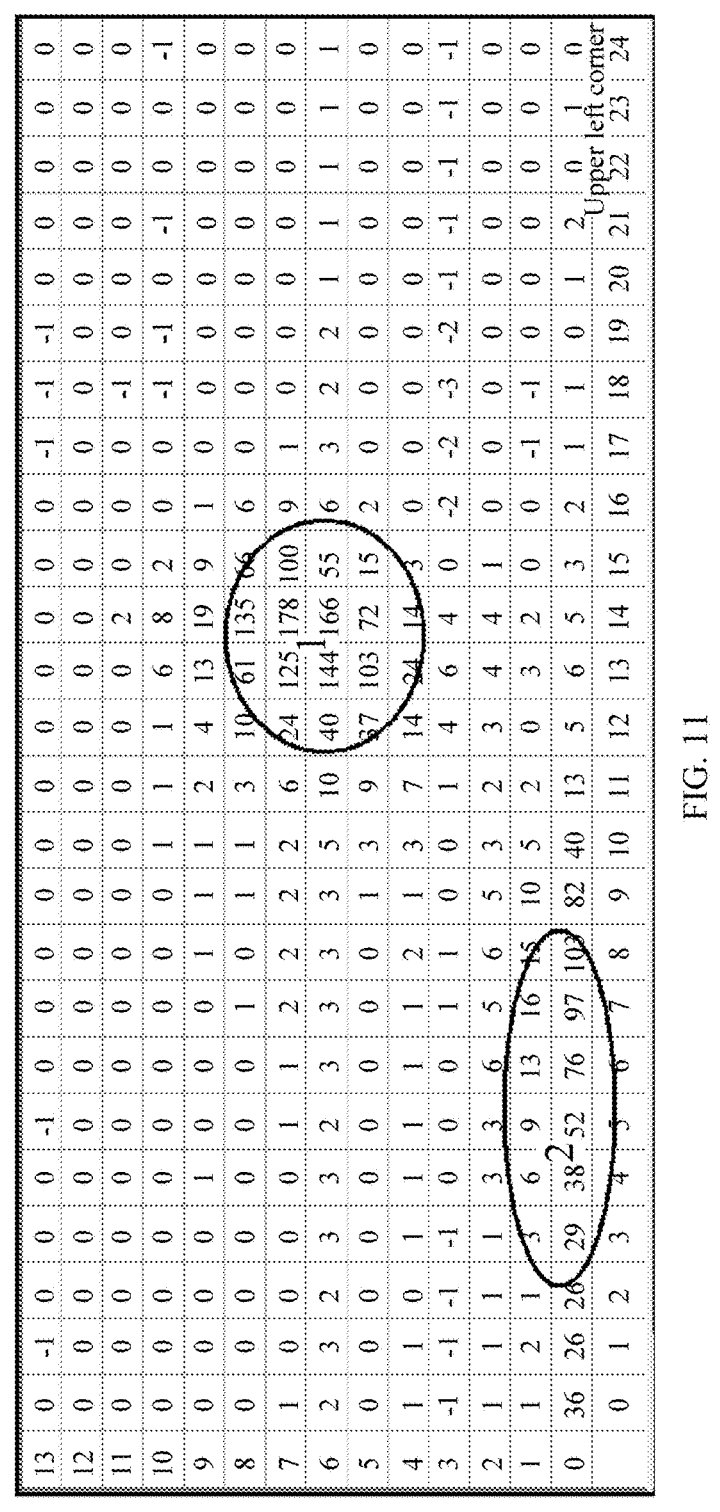
Figure 12:
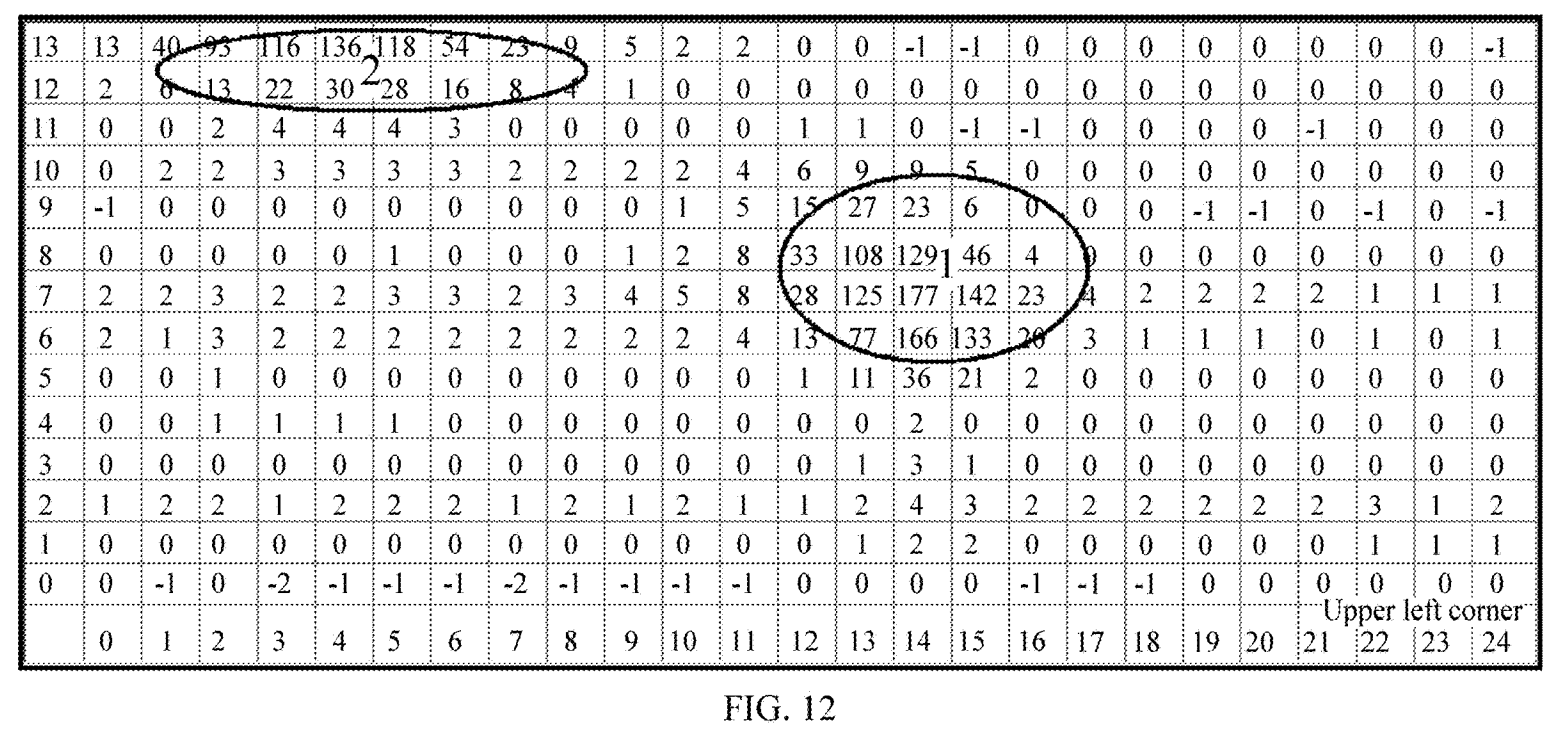

The following provides a description with reference to FIG. 9 to FIG. 13 using an example. FIG. 9 shows regions "1" and "2", which are in contact with the left hand when the left hand holds the terminal, on a capacitive touch screen. FIG. 10 shows regions "1" and "2", which are in contact with the right hand when the right hand holds the terminal, on a capacitive touch screen. In FIG. 9, "1" is a region which is in contact with the thumb of the left hand, and "2" is a region which is in contact with the palm of the left hand. In FIG. 10, "1" is a region which is in contact with a thumb of the right hand, and "2" is a region which is in contact with the palm of the right hand. Furthermore, FIG. 11 and FIG. 12 respectively show impacts that are caused by the contact regions "1" and "2" on capacitances in a touch region of the capacitive touch panel 810 when the two holding manners in FIG. 9 and FIG. 10 are used (referring to FIG. 11 and FIG. 12, capacitances in the regions "1" and "2" are different from surrounding capacitances).

Figure 13:
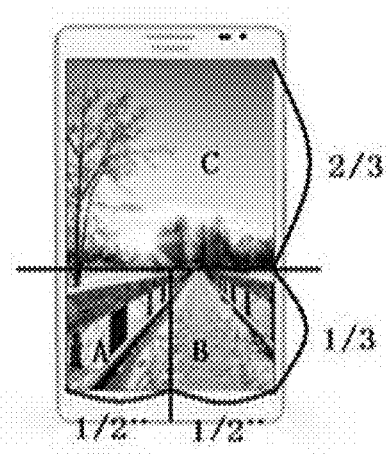
FIG. 13 is an exemplary diagram of touch region division for a terminal according to an embodiment of the present disclosure.

Based on the regions, which are in contact with a hand, on the capacitive touch panel 810, the screen may be divided into three parts. As shown in FIG. 13, in FIG. 13, a touch region is divided into regions A, B, and C. The region C is located on an upper part of the touch region, and may approximately account for two-thirds of a total area of the touch region. The regions A and B are located on a lower part of the touch region, and may approximately account for one-third of the total area of the touch region, where each of the regions A and B accounts for one half of the one-third area. It should be understood that region division in FIG. 13 is only an example, and in practice, an area of each region is comprehensively determined according to factors such as a size of the terminal and a size of the touch region.

For example, the region C may be further divided into a left region and a right region in order to determine more accurately whether a holding gesture for the terminal with a single hand is holding along an edge of the screen, or a holding gesture of diagonally crossing the screen that is shown in FIG. 9 or FIG. 10.

It should be understood that the processor 820 may detect all touch regions of the capacitive touch panel 810 each time, and then determine the holding gesture for the terminal 800 according to detection results of all the touch regions. Alternatively, when the processor 820 detects the holding gesture for the terminal 800 each time, the processor 820 sequentially performs the detection, and may stop the detection when the holding gesture for the terminal 800 can be determined according to currently detected touch regions. In this detection manner, the holding gesture for the terminal 800 can be determined without detecting all the regions of the capacitive touch panel 810 each time.

For example, when the touch region is divided in the manner in FIG. 13, and it is detected whether the terminal 800 is held by the left hand or the right hand, the detection may be performed in the following sequence: first detecting the region C, determining that no hand holds the terminal 800 when there is no capacitance change in the region C, continuing to detect the region A when there is a capacitance change in the region C, determining that the left hand holds the terminal when there is a capacitance change in the region A, continuing to detect the region B when there is no capacitance change in the region A, determining that the right hand holds the terminal when there is a capacitance change in the region B.

It may be understood that the terminal 800 may be a terminal with a capacitive touch screen such as a smartphone or a tablet computer.

Figure 14:
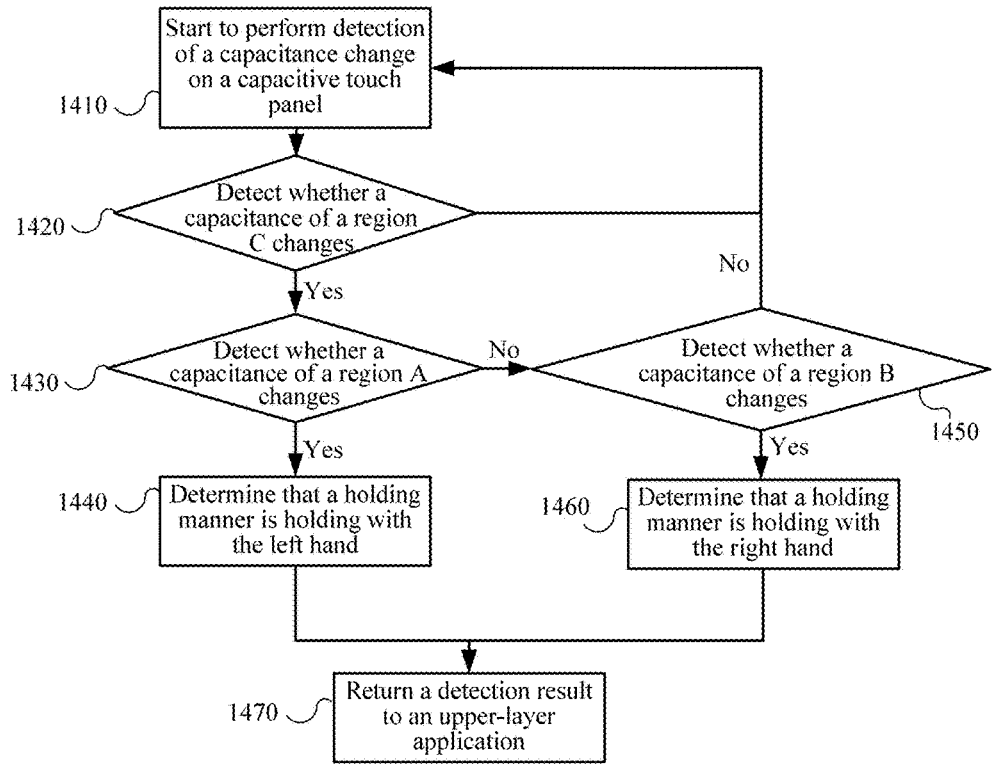
FIG. 14 is a flowchart of a method for detecting a holding gesture for a terminal according to an embodiment of the present disclosure.

FIG. 14 is a flowchart of a method for detecting a holding gesture for a terminal according to an embodiment of the present disclosure. The method in FIG. 14 may be executed by the foregoing terminal 800. In FIG. 14, the terminal 800 may detect two holding gestures holding with the left hand and holding with the right hand. In FIG. 14, a touch region of a capacitive touch panel 820 is divided in the manner in FIG. 13.

Step 1410: Start to perform detection of a capacitance change on a capacitive touch panel.

The terminal 800 may perform detection on the capacitive touch panel according to a period, or may start and end detection according to an instruction of a user, which is not limited in this embodiment of the present disclosure.

Step 1420: Detect whether a capacitance of a region C changes.

When the capacitance of the region C changes, step 1430 is performed, and when the capacitance of the region C does not change, step 1410 is returned to.

Step 1430: Detect whether a capacitance of a region A changes.

When the capacitance of the region A changes, step 1440 is performed, and when the capacitance of the region A does not change, step 1450 is performed.

Step 1440: Determine that a holding manner is holding with the left hand.

Step 1450: Detect whether a capacitance of a region B changes.

When the capacitance of the region B changes, step 1460 is performed, and when the capacitance of the region B does not change, step 1410 is returned to.

Step 1460: Determine that a holding manner is holding with the right hand.

Further, when it is determined that the holding manner of the terminal 800 is holding with the left hand or holding with the right hand, step 1470 may be further performed.

Step 1470: Return a detection result to an upper-layer application.

In this embodiment of the present disclosure, a corresponding touch region of a capacitive touch panel that a hand touches is determined using a capacitance change generated by the capacitive touch panel disposed in a terminal, and a holding gesture for the terminal is determined according to the touch region and a preset correspondence between a touch region and a holding gesture.

The terminals and the method that can intelligently determine a holding gesture for a terminal are described above in detail with reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG.13, and FIG. 14, and application of the terminals and the method are described below.

Application scenario one: A User Interface (UI) scenario is intelligently adjusted according to a determined holding gesture, or a virtual keyboard, a music player, or an unlock interface of a mobile phone is adjusted according to a determined holding gesture.

Further, when holding with the right hand is detected, a UI scenario displayed on a touch screen or a control interface on which a user needs to input information may be automatically adjusted to a rightward region such that preferably, the single right hand can perform control. For example, when it is detected that a mobile phone is held by the right hand, a virtual keyboard, a music player, an unlock interface, or the like of the mobile phone may be displayed on the right side of the mobile phone.

Application scenario two: Unnecessary switching between a landscape mode and a portrait mode is avoided according to a determined holding gesture.

Furthermore, when a user lies on a side and holds a mobile phone with the left hand, the mobile phone automatically switches from the portrait mode to the landscape mode, but in this scenario, the user actually does not intend to switch the mobile phone from the portrait mode to the landscape mode. Using the terminals in the embodiments of the present disclosure, it may be set that whether switching between the landscape mode and the portrait mode is performed is determined according to a holding manner of a hand, or display in the landscape mode or the portrait mode is determined according to a holding manner of a hand, which can effectively avoid the foregoing case, and improve user experience.

It should be noted that the foregoing application is described only for an exemplary purpose, and in practice, an application scenario of the left hand and the right hand may be set according to a requirement, which is not further limited in the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or hardware in addition to software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any change or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A terminal, comprising:
    a capacitive touch panel configured to generate a capacitance change when a hand touches the capacitive touch panel; and
    a processor coupled to the capacitive touch panel and configured to:
        determine, according to the capacitance change, a touch region on the capacitive touch panel that the hand touches; and
        determine a holding gesture for the terminal according to the touch region and a preset correspondence between the touch region and the holding gesture, wherein the preset correspondence between the touch region and the holding gesture comprises:
            dividing the capacitive touch panel into a first touch region, a second touch region, and a third touch region in advance, wherein the first touch region is tapped or slid by a thumb of a left hand when the left hand holds the terminal, wherein the second touch region is in contact with a left palm when the left hand holds the terminal, and wherein the third touch region is in contact with a right palm when a right hand holds the terminal;
            determining that holding with the left hand is the holding gesture for the terminal when there are capacitance changes in the first touch region and the second touch region; and
            determining that holding with the right hand is the holding gesture for the terminal when there are capacitance changes in the first touch region and the third touch region.

2. A terminal, comprising:
    a capacitive touch panel configured to generate a capacitance change when a hand touches the capacitive touch panel; and
    a processor coupled to the capacitive touch panel and configured to:
        determine, according to the capacitance change, a touch region on the capacitive touch panel that the hand touches: and
        determine a holding gesture for the terminal according to the touch region and a preset correspondence between the touch region and the holding gesture, wherein the preset correspondence between the touch region and the holding gesture comprises:
            dividing the capacitive touch panel into first touch region, a second touch region, and a third touch region in advance, wherein the first touch region is tapped or slid by a thumb of a right hand when the right hand holds the terminal, wherein the second touch region is in contact with a right palm when the right hand holds the terminal, and wherein the third touch region is in contact with a left palm when a left hand holds the terminal;
            determining that holding with the right hand is the holding gesture for the terminal when there are capacitance changes in the first touch region and the second touch region; and
            determining that holding with the left hand is the holding gesture for the terminal when there are capacitance changes in the first touch region and the third touch region.

3. A terminal, comprising:
    at least one conductive sheet configured to form at least one capacitor with a hand when the terminal is in contact with the hand, wherein the at least one conductive sheet comprises a first conductive sheet located on or near a left side of the terminal and a second conductive sheet located on or near a right side of the terminal, wherein when the terminal is held by the hand, the first conductive sheet and the hand form a first capacitor and the second conductive sheet and the hand form a second capacitor; and
    a processor separately coupled to the first conductive sheet and the second conductive sheet and configured to:
        separately detect capacitances of the first capacitor and the second capacitor; and
        determine a holding gesture for the terminal according to the detected capacitances and a preset correspondence between the capacitances and the holding gesture.

4. The terminal according to claim 3, wherein the preset correspondence between the capacitances and the holding gesture comprises determining that the holding gesture for the terminal is holding with a left hand when the capacitance of the first capacitor is greater than the capacitance of the second capacitor.

5. The terminal according to claim 3, wherein the preset correspondence between the capacitances and the holding gesture comprises determining that the holding gesture for the terminal is holding with a left hand when a difference between the capacitance of the first capacitor and the capacitance of the second capacitor is greater than a first threshold.

6. The terminal according to claim 3, wherein the preset correspondence between the capacitances and the holding gesture comprises determining that the holding gesture for the terminal is holding with a left hand when capacitance data is within a first data set, wherein the capacitance data comprises the capacitance of the first capacitor and the capacitance of the second capacitor, wherein the first data set is a data set determined in advance, and wherein the first data set corresponds to holding with the left hand.

7. The terminal according to claim 6, wherein the capacitance data is a data point that has a horizontal coordinate that is the capacitance of the first capacitor and a vertical coordinate that is the capacitance of the second capacitor, and wherein the first data set and a second data set are coordinate regions in a coordinate system.

8. The terminal according to claim 3, wherein the first conductive sheet and the second conductive sheet are symmetrically arranged along a central line between the left side and the right side of the terminal.

9. The terminal according to claim 3, wherein the processor comprises a capacitance detection chip and a central processing unit (CPU) coupled to the capacitance detection chip, wherein the capacitance detection chip is separately coupled to the first conductive sheet and the second conductive sheet, wherein the capacitance detection chip is configured to separately detect the capacitances of the first capacitor and the second capacitor, and wherein the CPU is configured to determine the holding gesture for the terminal according to the detected capacitances and the preset correspondence between the capacitances and the holding gesture.

10. The terminal according to claim 9, wherein the capacitance detection chip comprises multiple pins, wherein the first conductive sheet is coupled to a first pin of the multiple pins using a first conductive wire, wherein the second conductive sheet is coupled to a second pin of the multiple pins using a second conductive wire, wherein the multiple pins further comprise a third pin and a fourth pin, wherein the third pin is coupled to a third conductive wire, wherein the third conductive wire is arranged in parallel with the first conductive wire, wherein the fourth pin is coupled to a fourth conductive wire, and wherein the fourth conductive wire is arranged in parallel with the second conductive wire.

11. The terminal according to claim 3, wherein the at least one conductive sheet further comprises a third conductive sheet, wherein the third conductive sheet is located on a left side, a right side, or a back side of the terminal, wherein the at least one capacitor further comprises a third capacitor formed by the third conductive sheet and the hand, and wherein the preset correspondence between the capacitances and the holding gesture comprises determining that the holding gesture for the terminal is holding with a left hand when a capacitance of the third capacitor is within to a first value range.

12. The terminal according to claim 3, wherein a length of the at least one conductive sheet is greater than or equal to six centimeters, and wherein a width of the at least one conductive sheet is greater than or equal to one point five millimeters.

13. The terminal according to claim 3, wherein the at least one conductive sheet is any one of a copper sheet, a flexible printed circuit (FPC), a steel use stainless (SUS) steel sheet, and graphite.

14. The terminal according to claim 3, wherein the processor comprises a capacitance detection chip and a central processing unit (CPU), wherein the capacitance detection chip is coupled to the at least one conductive sheet and configured to detect the capacitance of the at least one capacitor, and wherein the CPU is coupled to the capacitance detection chip and configured to determine the holding gesture for the terminal according to the detected capacitance and the preset correspondence between the capacitances and the holding gesture.

15. The terminal according to claim 3, wherein the processor is a central processing unit (CPU).

16. The terminal according to claim 3, wherein the processor is a capacitance detection chip.

17. The terminal according to claim 3, wherein the preset correspondence between the capacitances and the holding gesture comprises determining that the holding gesture for the terminal is holding with a right hand when the capacitance of the first capacitor is less than the capacitance of the second capacitor.

18. The terminal according to claim 3, wherein the preset correspondence between the capacitances and the holding gesture comprises determining that the holding gesture for the terminal is holding with a right hand when a difference between the capacitance of the second capacitor and the capacitance of the first capacitor is greater than a second threshold.

19. The terminal according to claim 3, wherein the preset correspondence between the capacitances and the holding gesture comprises determining that the holding gesture for the terminal is holding with a right hand when capacitance data is within to a second data set, wherein the second data set is determined in advance, and wherein the second data set corresponds to holding with the right hand.

20. The terminal according to claim 3, wherein the at least one conductive sheet further comprises a third conductive sheet, wherein the third conductive sheet is located on the left side, the right side, or a back side of the terminal, wherein the at least one capacitor further comprises a third capacitor formed by the third conductive sheet and the hand, and wherein the preset correspondence between the capacitances and the holding gesture comprises determining that the holding gesture for the terminal is holding with a right hand when a capacitance of the third capacitor is within to a second value range.

* * * * *